United States Patent [19]

Call et al.

[11] Patent Number: 4,907,449
[45] Date of Patent: Mar. 13, 1990

[54] METEOROLOGICAL DATA ENCODER FOR MEASURING ATMOSPHERIC CONDITIONS

[75] Inventors: David B. Call, Boulder; James A. Nolan, Evergreen; Steven J. Lassman, Boulder, all of Colo.

[73] Assignee: A.I.R., Inc., Boulder, Colo.

[21] Appl. No.: 926,361

[22] Filed: Oct. 31, 1986

[51] Int. Cl.[4] .................. G01W 1/04; G01L 9/12; G01R 27/26
[52] U.S. Cl. .................. 73/170 R; 73/724; 374/170
[58] Field of Search ............ 374/170, 163, 184, 183; 73/170 R, 718, 724; 361/283

[56] References Cited

U.S. PATENT DOCUMENTS

| 4,065,715 | 12/1977 | Jaffe et al. | 374/184 |
| 4,424,713 | 1/1984 | Kroninger, Jr. et al. | 73/718 |
| 4,488,823 | 12/1984 | Baker | 374/170 |

FOREIGN PATENT DOCUMENTS 0030733  2/1988  Japan .................. 374/163

Primary Examiner—Charles A. Ruehl
Attorney, Agent, or Firm—John E. Reilly

[57] ABSTRACT

A radiosonde has a novel and improved measuring circuitry for measuring atmospheric conditions, such as, temperature, humidity and pressure through the direct conversion of resistance and capacitance values into binary numbers. The binary numbers are transmitted in digital form along with calibration coefficients to a remote ground station. The measuring circuitry can be mounted on the same substrate with the pressure transducer, and the electrical connections between the pressure transducer and measuring circuitry are simplified by utilization of an offset diaphragm, pressure cell arrangement.

18 Claims, 3 Drawing Sheets

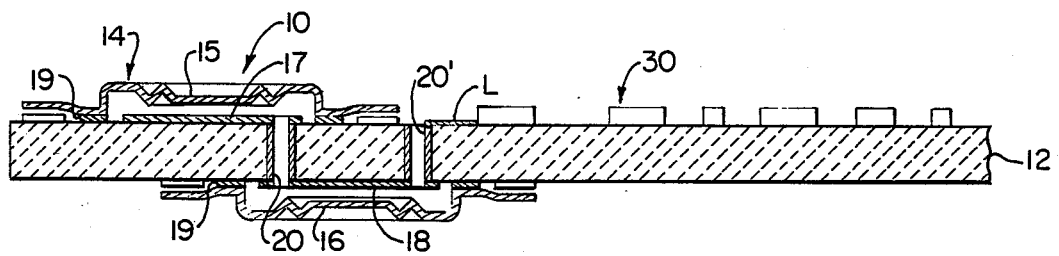
FIG. 1
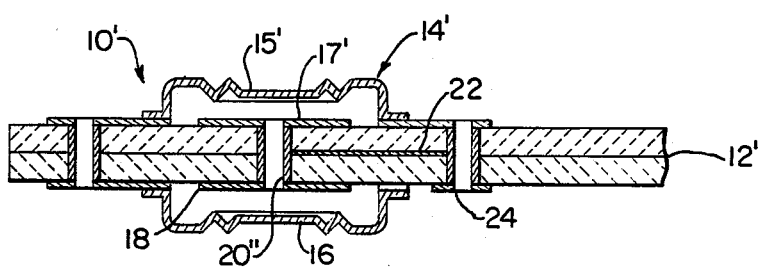
FIG. 2
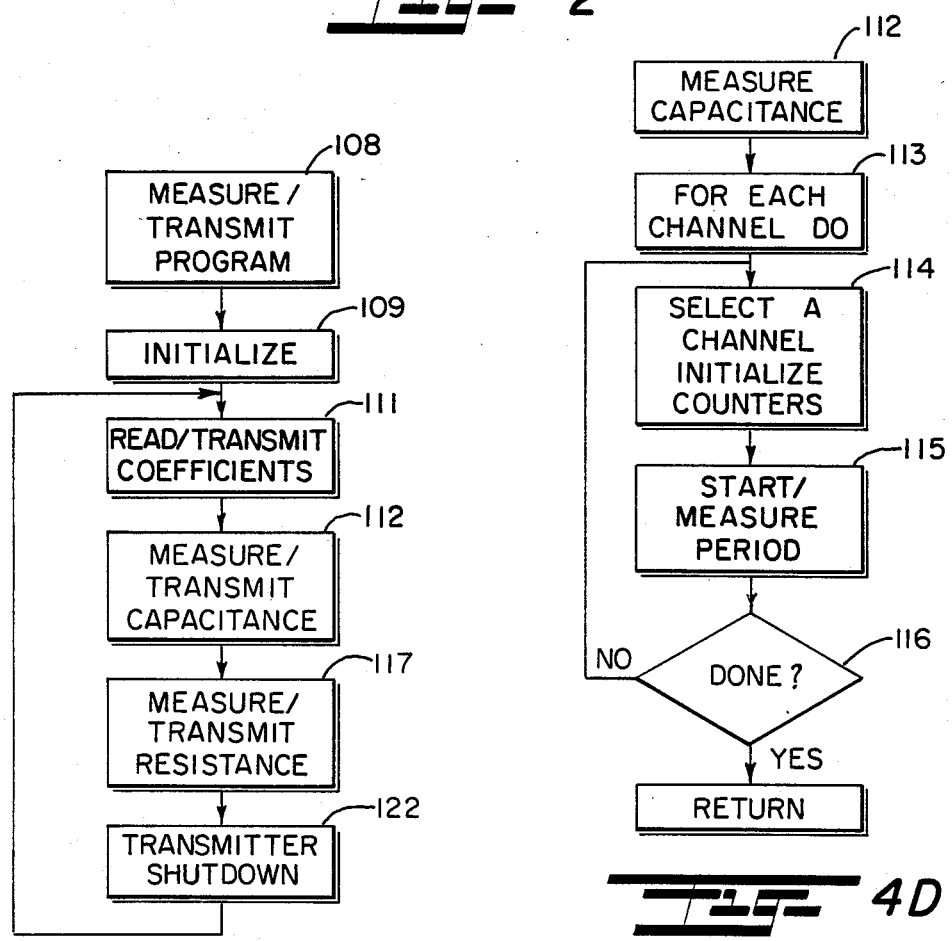
FIG. 4A
FIG. 4D

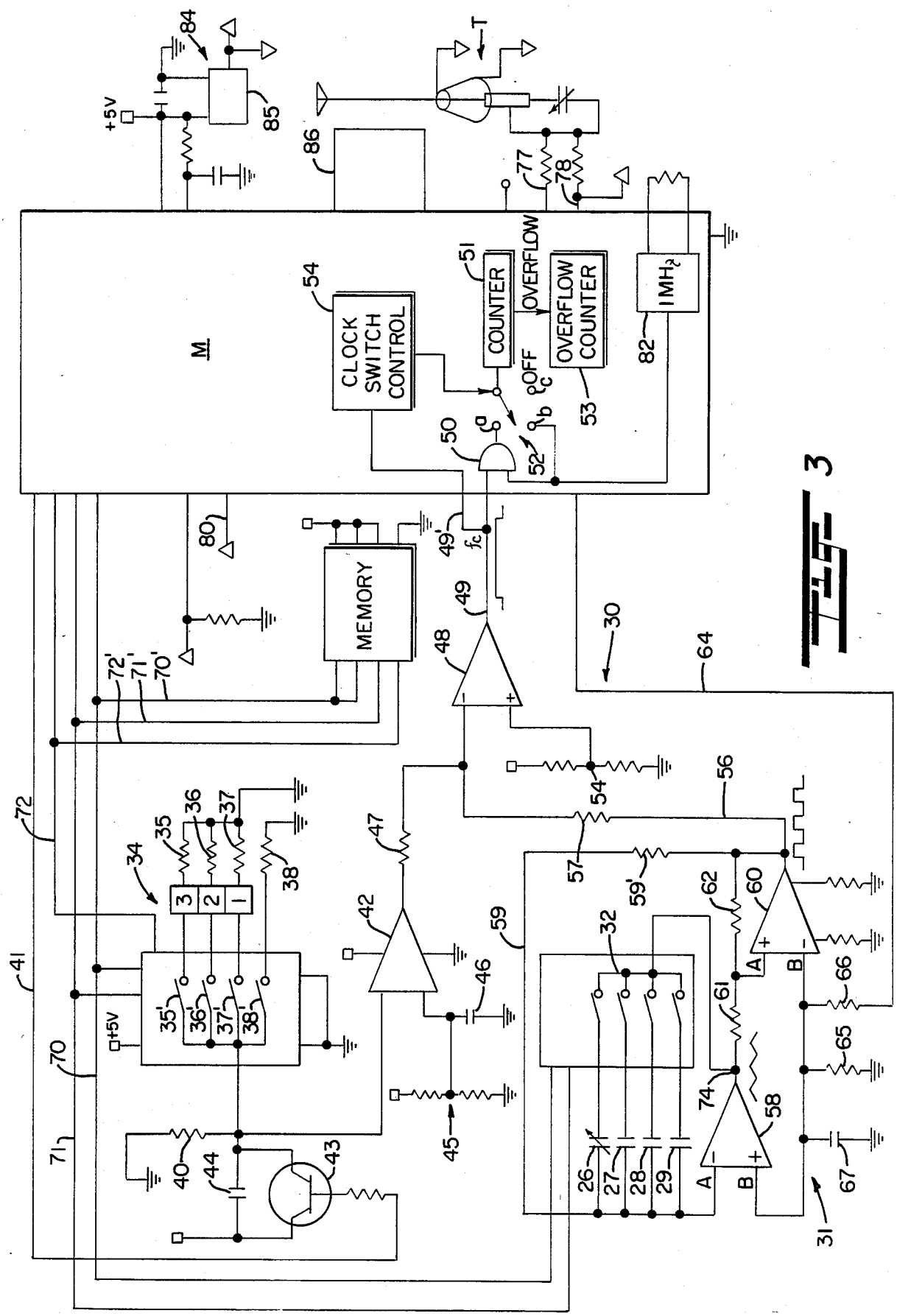

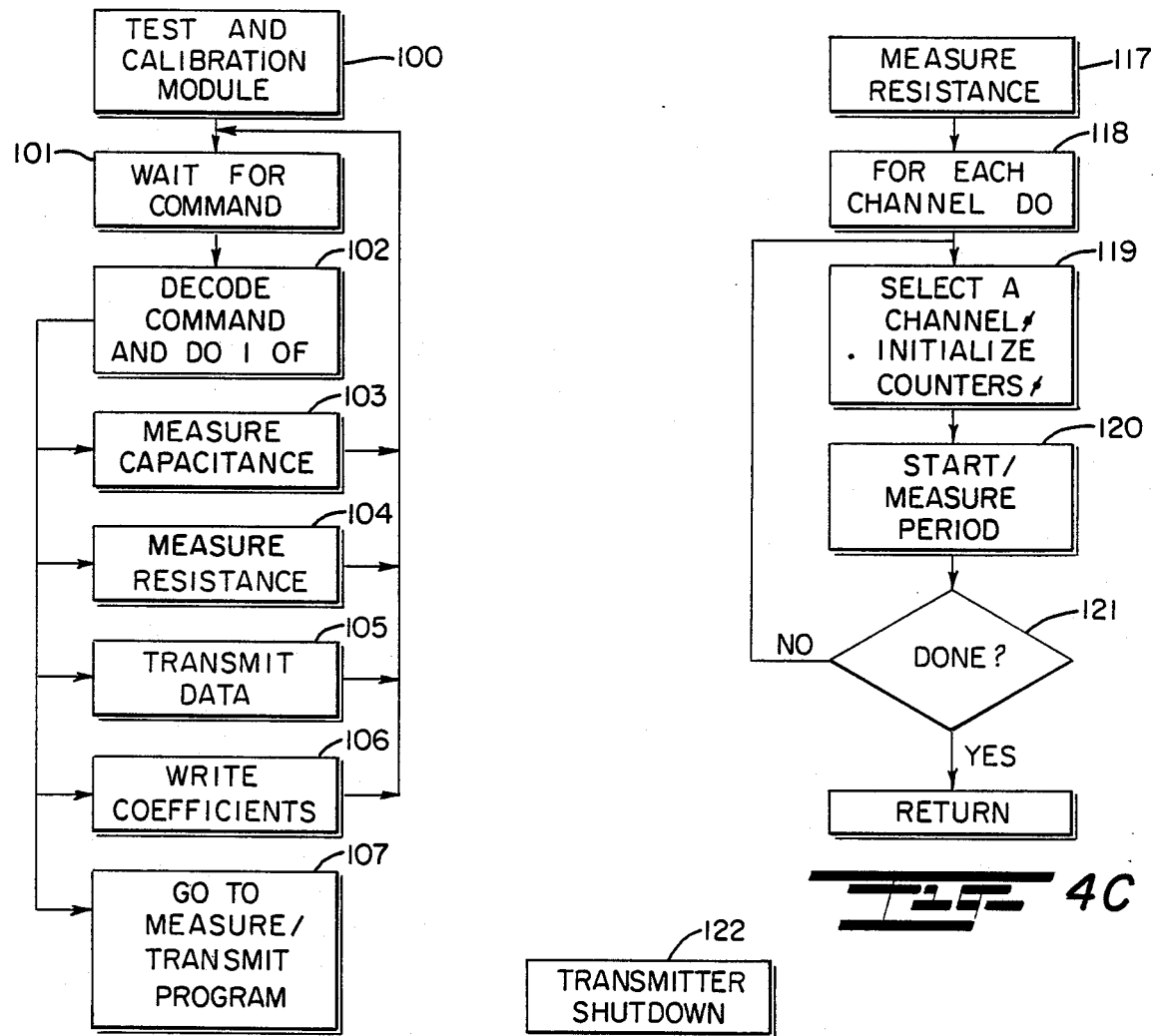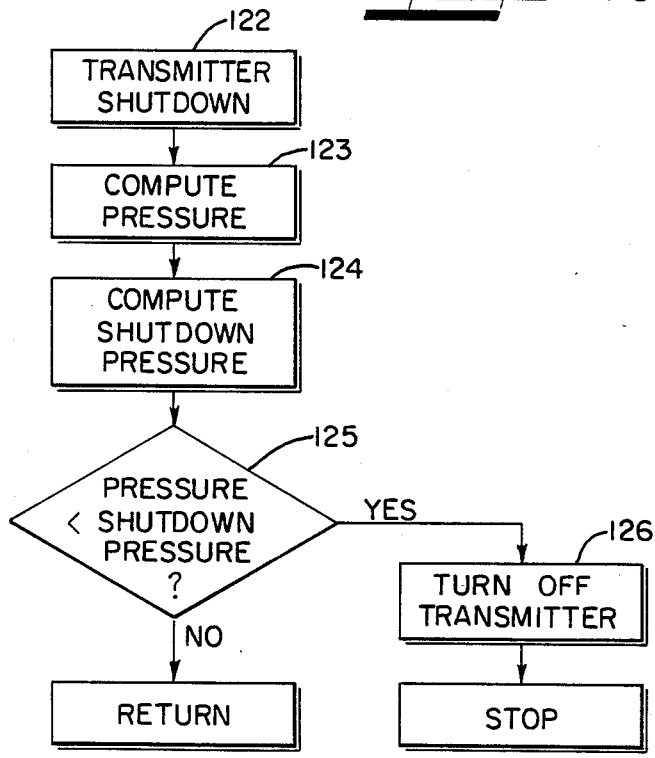

METEOROLOGICAL DATA ENCODER FOR MEASURING ATMOSPHERIC CONDITIONS

This invention relates to measuring instruments; and more particularly relates to a novel and improved digital radiosonde meteorological data encoder for measuring atmospheric conditions.

BACKGROUND AND FIELD OF INVENTION

Radiosondes are customarily employed to measure atmospheric conditions including pressure, temperature and humidity. The radiosonde is airborne and, among other sensing elements, includes a pressure transducer in the form of a pressure sensitive diaphragm for measuring variations in pressure, a thermistor for measuring temperature and a carbon hygristor for measuring humidity. In the past, at least the diaphragm has been mounted with or without the other sensing elements as a separate assembly apart from the electronic circuitry required to convert the analog readings from the measuring or sensing elements into signals which can be transmitted to a remote ground station. In many cases, the radiosonde also incorporates a receiver to receive position information for windfinding, and these signals are transmitted to the ground station, also.

It has been heretofore proposed to measure temperature, humidity and pressure conditions in the atmosphere by electronic circuitry which will generate voltage signals representing the various parameters, and an analog-to-digital converter is employed to convert those signals into digital form which can be transmitted to a remote ground station. Typically, the converter is sequentially connected to the sensing elements through a multiplexer to receive the analog signals representing the sensed atmospheric conditions and convert same to digital form. A microprocessor interfaces with the converter to process the signals so converted and delivered to an RF transmitter which transmits the information in digital form to the remote ground station. Representative patents are disclosed U.S. Pat. Nos. 4,481,514 to J. M. Beukers et al; 3,715,638 to W. R. Polye; 4,040,118 to S. A. Johnston and 4,084,438 to S. Y. Lee et al.

It is a feature of the present invention to measure atmospheric conditions including temperature, humidity and pressure by time interval measuring circuitry for the direct and accurate conversion of resistance and capacitance values representing those conditions into binary numbers. The binary numbers are transmitted in serial digital form, with error detection codes, to a remote ground station. A first measuring circuit is employed to measure resistance values in such a way as to avoid placing the temperature and humidity sensors in an RC oscillator circuit so that very little electromagnetic energy is radiated by the wires which connect the sensors to the resistance measurement circuitry and is particularly important if the radiosonde contains a receiver for receiving position information or location signals. The measuring circuit should be capable of measuring resistance over a wide dynamic range which will match the requirements for a thermistor and carbon hygristor and avoid the problems associated with the use of RC oscillators which impose limits on frequency variation therby resulting in losses in sensitivity.

A second measuring circuit is capable of measuring differential pressure or capacitance ratios in a pressure cell so that the effects of temperature, gain and component changes in the circuit do not affect its accuracy and greatly minimize the effects of stray capacitance on the accuracy of measurement. The time interval to be measured in each circuit is converted into a binary number by a common counter circuit associated with the system clock in the microprocessor and the entire system is program-controlled to order out the time intervals measured along with the necessary calibration coefficients for transmittal to a ground station. Another feature is to install the measuring and control circuitry on the surface of the ceramic that forms the substrate for a simplified form of offset diaphragm, pressure cell which obviates the extension of conductors or leads away from the interior of the diaphragm and results in an extremely compact assembly thereby avoiding the effects of stray capacitance.

SUMMARY OF THE INVENTION

It is therefore an object of the present invention to provide for a novel and improved measuring instrument particularly of the type capable of measuring meteorological conditions in an accurate and dependable manner.

It is another object of the present invention to provide for a novel and improved radiosonde for measuring meteorological data and which combines all of the sensing elements and electronic circuitry onto a single circuit board thereby resulting in a compact, lightweight assembly which will minimize mounting stress errors and stray capacitance.

A further object of the present invention is to provide for direct conversion of atmospheric conditions sensed into time interval measurements representing those conditions for transmission to a remote receiving station in such a way as to avoid utilization of analog-to-digital converters.

Another object of the present invention is to provide for a novel and improved digital radiosonde meteorological data encoder for the direct and accurate conversion of resistance or capacitance values representative of rapidly changing temperature, relative humidity and pressure conditions into serial digital form and for transmitting such data along with error detection codes to a remote receiving station; and further wherein resistance can be measured over wide dynamic ranges and capacitance can be measured in such a way as to avoid stray capacitance changes as well as the effects of temperature, gain and other component changes in the circuit.

A still further object of the present invention is to provide a digital radiosonde for measuring atmospheric conditions via resistance or capacitance measurements of temperature, relative humidity and pressure without interfering with the reception of navigational or location signals.

It is an additional object of the present invention to provide for a novel and improved offset diaphragm pressure cell for measuring pressure changes in the atmosphere by converting same into capacitance values in an efficient, reliable manner.

In accordance with the present invention, there has been devised for use in a radiosonde a novel and improved form of time interval measuring circuit having first and second variable resistors whose resistance values vary in direct proportion to temperature and relative humidity, respectively, at least one reference resistor with a normally open switch in series with each of the variable resistors and reference resistor and a capacitor having a fixed time constant connectable to each of the reference resistor and variable resistors. The capacitor is charged when each switch is closed into one of the reference and variable resistors and a comparator is responsive to charging of the capacitor at a predetermined level to switch the comparator to an opposite state, and time interval measuring means includes a counter for generating a binary number as a measurement of the time required by each resistor in association with the capacitor to switch the comparator. The same time interval measuring circuit is employed to measure the period of oscillation of a second comparator in a capacitance measuring circuit representative of changes in pressure in a pressure cell associated with the capacitance measuring circuit. The rate of oscillation is converted into a binary number for transmittal to the ground station. Calibration coefficients for the variable resistors and capacitors are stored in a programmable memory for transmittal to the ground station along with the actual resistance and capacitive measurements. The entire system is program-controlled to correlate the taking of resistance and capacitance measurements with the initialization of the counters for transmittal to ground along with the calibration coefficients in a coordinated sequence.

In a preferred form of the invention, the measuring circuitry is mounted on a substrate which supports the pressure cell, the pressure cell having diaphragm members hermetically secured to opposite surfaces of the substrate but in offset relation to one another so as to highly simplify the electrical connection between the pressure cell and measuring circuitry.

The above and other objects, advantages and features of the present invention will become more readily understood and appreciated from a consideration of the following detailed description of a preferred embodiment when taken together with the accompanying drawings in which:

BRIEF DESCRIPTION OF THE DRAWINGS

FIG. 1 is a cross-sectional view of one form of radiosonde in which the necessary pressure transducer and electronic circuitry are mounted on a common substrate;

FIG. 2 is a cross-sectional view of an alternate form of transducer to that shown in FIG. 1;

FIG. 3 is a block diagram of the preferred form of encoding circuit employed in accordance with the present invention; and FIGS. 4A-4E are program flow charts for the system.

DETAILED DESCRIPTION OF THE PREFERRED EMBODIMENT

Referring to FIG. 1 of the drawings, a radiosonde 10 is broadly comprised of a non-conductive, ceramic substrate 12 for an offset, dual diaphragm, capacitive pressure transducer 14. The transducer 14 is made up of pressure responsive, laterally off-set metal diaphragms 15 and 16 together with internal capacitive plates 17 and 18, respectively, centered within each of the diaphragms 15 and 16. The diaphragms are of generally circular configuration and are attached by soldering along their outer peripheral edges to metallized rings 19 on opposite surfaces of the substrate and specifically each diaphragm is soldered or bonded hermetically to the substrate. The plates or metallized areas 17 and 18 are centered within the chamber formed by each diaphragm and are electrically interconnected by a common terminal 20 extending from an edge of one plate 17 through the substrate 12 into connection with a peripheral edge of the other plate 18. A second terminal 20' is directed from the diametrically opposed edge of the plate 18 upwardly through the substrate 12 so as to exit at a location externally of the upper diaphragm 15 to facilitate electrical connection via external leads L to the necessary measuring electronic circuitry 30 which is installed directly on the surface of the substrate. In this way, the transducer can be fabricated on a single layer ceramic material or substrate while retaining the advantages of a symmetrical, dual diaphragm construction where the capacitors or diaphragms are in direct or axial alignment on opposite sides of the substrate, such as, a prior art transducer of the type illustrated in FIG. 2 and which is constructed in a manner described in more detail in U.S. Pat. No. 4,040,118 to S. A. Johnston.

In FIG. 2, like parts are designated by corresponding prime numerals wherein a double layer substrate 12' is shown for mounting of a pair of diaphragms 15' and 16 in direct alignment, and metallized areas 17' and 18 are sealed within each of the diaphragms so as to form a variable capacitor. As opposed to the offset construction of FIG. 1, the plates 17' and 18' are electrically interconnected by a common terminal 20'', but in order to connect the terminal externally it is necessary to extend a lead or metallized area 22 in an outward radial direction away from the terminal 20 between the substrate layers for connection to an external terminal 24. The terminal 24 is then connectable into the electronic measuring circuitry 30 as depicted in FIGS. 1 and 3.

In either type of diaphragm construction as illustrated in FIGS. 1 and 2, a capacitance is generated in response to the differential pressure between the diaphragms 15 and 16 as represented at 26 in FIG. 3. As noted in FIG. 3, the variable capacitor 26 is connected in parallel to a high reference capacitor 27, a temperature measuring capacitor 28 and a low reference capacitor 29, the capacitors 26 to 29 each connected in series to a switch in switch bank 32. In a manner to be described, the capacitance across capacitor 26 is compared with the high and low reference capacitors 27 and 29 along with the capacitor 28 which measures the substrate temperature.

The measuring circuit 30 includes a resistance measuring circuit 34 having a thermistor resistance 35, hygristor resistance 36, spare channel resistance 37 and switch reference resistor 38 connected in series with switches 35', 36', 37', 38' respectively. In addition, the resistances 35 to 38 are each connected in parallel with a precision, fixed resistance 40. The variables, as represented by the resistances 35 to 37, are measured by a unique form of time interval measuring circuit including a comparator 42, bipolar transistor 43 and capacitor 44. The switches 35' to 38' are normally open switches and are successively closed by signals generated in response to commands from the microprocessor software and directed over lines 70, 71 and 72. A limited time interval after each switch is closed, a control signal is directed over control line 41 from microprocessor M to the transistor 43, the transistor 43 is turned on and the capacitor 44 discharges. Transistor 43 is then turned off and the capacitor 44 will start charging through the resistor 40. When the capacitor 44 reaches a particular voltage or trip point, the comparator 42 is switched to the opposite state. As a preliminary to the variable resistor measurements, the reference resistor 40 is measured with all of the switches open in the same manner as described with respect to the variable resistors 35 to 38.

A voltage divider 45, including a filter capacitor 46, establishes the reference point for the comparator 42, and a resistance 47 at the output of the comparator is directed into one input of an operational amplifier 48 which functions as an OR gate in passing signals either from the resistance measuring circuit 34 or the capacitance measuring circuit 31. The output of the amplifier 48 is connected via line 49 to one input of AND gate 50. A counter 51 is selectively connectable via switch 52 to contact 52a from the output of gate 50, contact 52b to the "internal" line from an oscillator clock circuit 82, or to "off" contact 52c. The clock circuit 82 is connected to the other input of AND gate 50. The counter 51 is connected to a high order, overflow counter 53 and to the system clock 82.

In order to provide a direct, accurate measurement of resistance, again the transistor 43 is turned on to fully discharge the capacitor 44 and to trip the comparator 42. The clock control 54 will position the counter clock switch 52 to "off" contact 52c and to zero the counters 51 and 53. A channel selection signal is directed over lines 70 and 71 to select the resistance to be measured and, following a brief time delay, a control signal is then directed over line 41 to turn off the transistor 43 and charge the capacitor 44. A command from the clock control 54 will then position the counter clock switch 52 at contact 52a so as to connect the counter 51 to the output of the AND gate 50. Each time that the comparator 42 goes high or is tripped, its output will turn off the counters 51 and 53 and stop the count to establish each time interval which is then compared with the time interval required for the reference resistor 40 alone. In other words, the counters 51 and 53 will measure the length of the pulse effectively representing the time interval for the capacitor to charge and trip the comparator. The total count is then read and stored in the microprocessor memory and transmitted serially in the form of a digital data stream via transmitter lines 77 and 78. The only limitation upon the accuracy of the measurement is introduced through the switch resistance itself. However, the switch resistance for each of the unknown resistance measurements can be determined by closure of the switch 38' to the calibration or fixed resistance 38 and determining the time interval required for the known resistance 38 in parallel with the reference resistor 40 to trip the comparator 42.

In summary, five time intervals are successively measured:
(1) All switches 35', 36', 37' and 38' open so that only the reference resistor 40 is measured.
(2) 35' is closed to measure a resistance 35 in parallel with resistor 40.
(3) 36' is closed to measure a resistance 36 in parallel with resistor 40.
(4) 37' is closed to measure a resistance 37 in parallel with resistor 40.
(5) 38' is closed to measure a resistance 38 in parallel with resistor 40.

It will be seen from the foregoing that the resistance measuring circuit does not require an RC oscillator circuit. Thus, when the resistance probes are exposed to atmospheric conditions, little electromagnetic energy is radiated by the wires which connect the unknown resistances to the measuring circuit. This is important in order to prevent interference with reception of NAV-AID signals for position or location information in windfinding. The resistance circuit 34 is capable of measuring the resistance over a wide dynamic range from 1 kilohm to 20 megohms and matches the requirements for the thermistor and carbon hygristor resistances 35 and 36. Typically, the time required to trip the comparator 42 for each measurement is on the order of 1 to 100 milliseconds.

In the capacitance measuring circuit 31, as noted earlier, each of the capacitors 26 to 29 is connected in series to normally open switches 26' to 29', respectively, in switch bank 32. The capacitors are connected in common to the negative input of an operational amplifier 58 which together with comparator 60 forms an RC oscillator circuit. The output of comparator 60 is connected via line 56 containing resistor 57 to the input of the inverter or operational amplifier 48. A voltage divider 54 is connected to the other input of the inverter 48 to establish a reference voltage. The output of comparator 60 is also connected via feedback line 59 containing resistance 59' to the capacitors 26 to 29. Hysteresis is created at one input A to the comparator 60 by resistors 61 and 62 so as to act as a voltage divider at that input and to vary the trip point at the rate of several kilohertz. An enable line 64 from the microprocessor M applies a 5 volt signal to a voltage divider at the other input of the comparator, the voltage divider consisting of resistors 65 and 66 along with a filter capacitor 67. The output of the comparator feeds back through the resistor 59' and, by virtue of the characteristic operation of the amplifier 58, the voltage at negative input A from the feedback loop will correspond to the voltage at positive input B and is approximately one-half the supply voltage, or 2.5 volts. Preferably amplifier 58 is a CMOS amplifier with an extremely high impedance on the order of 20 megohms to 50 megohms. The voltage across the resistor 59' is constant, since the voltage is held at 2.5 volts by the amplifier 58. Since the voltage at the output of the comparator 60 is either zero or +5 volts, the current will flow through the feedback line 59 and charge one of the capacitors through the switchbank 32. The voltage across each of the capacitors 26 to 29 will vary and take the essential shape of a triangular waveform. The trip point of the comparator 60 is established by the voltage divider as defined by the resistors 61 and 62 and, when the voltage at the trip point is higher than the voltage at the other input B of the comparator 60, the comparator will trip to cause a voltage swing in the opposite direction and produce a square wave output as indicated. By virtue of the hysteresis in the comparator, the comparator 60 will remain in a given mode until once again switched; i.e., integrates down in the other direction and trips over to the other input.

The output of the comparator 60 is determined by measuring the period of a specific number of cycles on the order of 256 cycles. In this respect, the comparator effectively measures the high and low reference capacitors $C_H$ and $C_L$ and then measures the unknown capacitances 26 and 28 which will range between the high and low reference capacitors 27 and 29.

The capacitors are sequentially measured by control signals from the microprocessor clock circuit 82 and delivered via lines 70 and 71 to the switch bank 32 to close each switch 26 to 29 in succession over a predetermined time interval. As each capacitor is selected by closure of its associated switch in the switchbank 32, the capacitor is charged through resistor 59' and applied to terminal 74 at the output side of the amplifier 58. In this way, the output voltage of the integrator or amplifier 58 will vary at a rate proportional to the resistance 59' and the capacitance selected. When the voltage reaches a high set point determined by the ratio of resistances 61 and 62 at the input of the comparator 60, the comparator 60 output will switch state and the capacitor will discharge at a linear rate to a low set point whereupon oscillation repeats. The period of oscillation of the amplifier 58 and the comparator 60 results in a square wave output which is applied over line 56 through the inverter 48 to the gate 50 in the microprocessor M.

In the microprocessor M, an enabling signal is directed over line 64 followed by selection of the desired capacitor 26 to 29 to be measured by closing the appropriate channel or switch. The first falling edge of a square wave pulse received via line 49' will cause the counters 51 and 53 to return to zero. The counter clock switch 52 is positioned at contact 52a whereupon the next rising edge of a square wave pulse will activate the counter following which the switch is advanced to contact 52b. Timing signals from the system clock 82 are input directly to the counter 51 and overflow counter 53 while the software clock control 54 counts the number of cycles rising edges of the square wave pulses until N-cycles is reached at which point it will position the counter clock switch 52 to contact 52a. Time counting continues until the next falling edge of a pulse over line 49', after which the clock control 54 will then position the counter clock switch to 52c. The actual count in the counters then may be read and stored for transmittal through the transmitter lines 77 and 78. Thus, the greater the rate of oscillation, the less time is required for a fixed number of square waves.

In the manner described, the counter 51 will measure the period of oscillation as represented by the square wave pulses directly as a binary count over the time interval required to reach a given number of cycles or pulses and therefore avoids the necessity of analog-to-digital conversion. As a result, the count is formatted into a binary word or digital value for display. In the capacitance measuring circuit, since ratios are being measured between the capacitors 26 and 28 and the high and low reference capacitors 27 and 29, the effects of temperature, gain and component changes in the circuit do not affect its accuracy. Further, any effects of stray capacitance are greatly minimized since one end of the variable capacitor 26 remains at a constant voltage at the virtual ground of input 52a of amplifier 58, and the other end is at a low impedance point at the output of amplifier 58. This becomes significant in measuring, for instance, 10 picofarad capacitors to 0.001 picofarad accuracy.

Over the time period that the capacitance measuring circuit is enabled, the resistance measuring circuit 34 is disabled by a signal transmitted over line 72 to the resistance switchbank. Conversely, the capacitance measuring circuit is inhibited by an appropriate signal from the microprocessor M via line 64 to hold the input 52b of comparator low or at ground. The switchbanks as indicated for the respective measuring circuits 34 and 31 are part of one integrated chip and, accordingly, the binary signal lines 70 and 71 to the capacitance switchbank also tie into the resistance switchbank of the measuring circuit 34 to control the timing of either one depending upon which circuit is activated.

In the preferred form of the present invention, the switchbanks for the capacitance measuring circuit 31 and resistance measuring circuit 34 are part of a single integrated chip which, for example, is a Model MC 14052B digitally controlled analog multiplexer or switch. The microprocessor M may be a Model MC 1468705F2 eight-bit EPROM microcomputer unit of Motorola Corporation, Chicago, Ill. From the microprocessor M, terminals 77 and 78 transmit the digital data stream from the counters 50 and 51 to a remote ground station via FM transmitter designated at T. The FM transmitter is preferably one that will transmit Manchester code, such as, a Colpitts oscillator transmitter. It is desirable that the transmitter be turned off at a predetermined pressure or altitude condition and, to this end, the spare channel resistance 35 may be a variable potentiometer which is preset to represent a particular altitude in order to turn off the transmitter at a predetermined pressure level. When the transmitter is not sending the data to the ground station, it will transmit a middle frequency.

DETAILED DESCRIPTION OF SYSTEMS OPERATION

An appreciation of the operation of the radiosonde and its measuring circuit can be gained from a consideration of the sequence of steps followed in a typical measuring cycle and the program control employed in association therewith. Preliminary to describing the main program associated with the microprocessor M, reference is made to the flow chart of FIG. 4B and the sequence followed by a separate calibration program in testing and calibrating the system prior to flight in a pressure/temperature chamber, the system being connected to an external computer. The test computer interfaces to the microprocessor with three data/control lines and supervises the sampling and transmission of data. Very high precision resistors are connected to the resistance inputs 35, 36 and 37. Thus, the calibration program as represented at 100 waits for a command from the test computer at 101, then decodes the command as indicated at 102 and does one of the steps as indicated at 103, 104, 105 or 106. Specifically, at 103 the capacitances 26 to 29 are measured in succession with respect to a known temperature and pressure. At 104, each of the resistors 35 to 38 is measured. The data measured at 103 or 104 is transmitted at 105. After collecting data from the sonde, the computer computes the calibration coefficients and at 106, the coefficients are stored in a programmable memory 90. Preferably, the memory 90 is a NOVRAM or non-volatile RAM, such as, a XICOR Model 2144 manufactured and sold by Xicor, Inc., of Milpitas, Calif. The data is written into the NOVRAM 90 during calibration via control lines 70', 71' and 72'.

Referring to the main program 108 of FIG. 4A, the program is initialized at 109. The program reads the coefficients from the NOVRAM and transmits the coefficients. As represented at 112 and the flow chart of FIG. 4D, each capacitance channel as represented at 113 is measured in succession by selecting a channel and initializing the counters 51 and 53 in the microprocessor M as indicated at 114. The oscillator 82 is activated, and the period of oscillation measured as represented at 115. A determination is then made at 116 whether all channels have been completed. If so, the program returns to the main routine and transmits the measured capacitance periods via transmission lines 77 and 78. As represented at 117, the flow chart of FIG. 4C measures each of the resistors 35 to 38 and 40 in the measuring circuit 34, as represented at 118. As indicated at 119, each resistor or channel is selected and the counters 51 and 53 are initialized. The measurement is then started by counting the time interval or length of the pulse generated from each resistor or channel as at 120 and transmitting in succession via transmission lines 77 and 78 to the transmitter T. A determination is made at 121 whether all the channels or resistances were measured and, if so, the program is returned to the main routine and proceeds to the transmitter shutdown measurement as indicated at 122 and the flow chart of FIG. 4E. As noted earlier, pressure of the pressure cell is computed by the variable capacitance 26 and is represented at 123. Shutdown pressure from the shutdown resistance or potentiometer value 35 is determined as represented at 124. If actual pressure as determined from the pressure cell is less than shutdown pressure as determined at 125, the transmitter is turned off as at 126 and the program is terminated.

In the manner described, calibration coefficients stored in the NOVRAM memory 90 are transmitted via the transmitter T to the ground station S. This avoids the necessity of entering calibration test data onto a separate paper tape or other recording device which must then be transmitted to the user at the ground station in setting up the coefficients.

In the preferred form, the oscillator line 82 has a fixed resistance which determines the speed at which the clock circuit will run. Typically, this may be a 4 megahertz clock which is divided by four to transmit 1 megahertz signals or counts to the AND gate 50 as described. A 5 volt regulator 85 assures that a 5 volt supply is maintained in the microprocessor M, and the Baud rate is established at 86 in a conventional manner.

It is therefore to be understood from the foregoing that while a preferred embodiment of the present invention has been herein set forth and described, various modifications and changes may be made in the construction and arrangement of parts as well as the specific form of program employed without departing from the spirit and scope of the present invention as defined by the appended claims.

We claim:

1. In a radiosonde wherein a transmitter is operative to transmit digital data from a microprocessor to a base station, the improvement comprising:
    a reference resistor;
    at least one variable resistor means whose resistance varies in direct proportion to one of a plurality of sensed meteorological conditions including temperature and humidity, a normally open switch in series with each of said reference resistor and said variable resistor means;
    a capacitor having a fixed time constant connectable to each of said reference resistor and said variable resistor means;
    means for charging said capacitor when each said switch is closed between said capacitor and one of said reference and said variable resistor means, said means for charging said capacitor including a bipolar transistor and control signal means from said microprocessor operative to turn said transistor off to initiate charging of said capacitor;
    comparator means responsive to charging of said capacitor to a predetermined level in order to switch said comparator means to an opposite state; and
    time interval measuring means including counter means for generating a binary number as a measurement of the time required to switch said comparator means for transmittal to said base station.

2. In a radiosonde according to claim 1, including first variable resistor means whose resistance varies in direct proportion to temperature and second variable resistor means whose resistance varies in direct proportion to humidity.

3. In a radiosonde affording to claim 1, said reference resistor and said variable resistor connected in parallel to one another.

4. In a radiosonde according to claim 1, a capacitance measuring circuit including a first variable capacitor whose capacitance varies with changes in atmospheric pressure, high and low fixed reference capacitors and a temperature sensitive capacitor each in parallel with said first variable capacitor, a normally open switch in series with each of said variable, reference and temperature sensitive capacitors, oscillator circuit means whose input is connected in common to each of said series connected capacitors and switches, means for sequentially closing each of said switches to charge each capacitor in succession, said oscillator circuit means having a period of oscillation proportional to the rate of discharge of each of said capacitors, and said time interval measuring means operative to measure the period of oscillation of said oscillator circuit means in discharging each capacitor.

5. In a radiosonde according to claim 4, including means for disabling said resistance measuring circuit when measurements are being taken from said capacitance measuring circuit, said time interval measuring means including counter means for measuring the length of each pulse generated by said resistance measuring circuit with respect to time and for measuring the number of pulses generated by said capacitance measuring circuit with respect to time.

6. In a radiosonde according to claim 5, said variable capacitor defined by a pressure cell including a nonconductive substrate, said resistance measuring circuit and said capacitance measuring circuit mounted on said substrate for said pressure cell.

7. In a radiosonde according to claim 6, said pressure cell including pressure-responsive diaphragms mounted on opposite surfaces of said substrate in offset relation to one another, capacitance plates centered within each of said diaphragms electrically connected to one another, one of said capacitance plates projecting beyond the periphery of the other of said diaphragms and including an electrical connection extending through said substrate into connected relation to said capacitance measuring circuit.

8. In a radiosonde according to claim 4, said oscillator circuit means including a comparator and a fixed resistance interconnected between the output of said comparator and said common connection to said variable, reference and temperature sensitive capacitors.

9. In a radiosonde wherein a transmitter is operative to transmit digital data from a microprocessor to a base station, the improvement comprising:
    a resistance measuring circuit including a reference resistor, at least one variable resistor means whose resistance varies in direct proportion to one of a plurality of sensed meteorological conditions including temperature and relative humidity, a normally open switch in series with each of said reference resistor and said variable resistor means, a capacitor having a fixed time constant connectable to each of said reference resistor and said variable resistor means, means for charging said capacitor when each said switch is closed between said capacitor and one of said reference and said variable resistor means, and comparator means responsive to charging of said capacitor to a predetermined level in order to switch said comparator means to an opposite state;

time interval measuring means including counter means in said microprocessor for generating a binary number as a measurement of the time required to switch said comparator means; and a capacitance measuring circuit including a pressure cell having a capacitance which varies with changes in atmospheric pressure, and high and low fixed reference capacitors each in parallel with said pressure cell, switching means in series with each of said pressure cell and said reference capacitors, oscillator circuit means whose input is connected in common to each of said switches, control signal means for sequentially closing each of said switches to charge each said reference capacitor and said pressure cell capacitance in succession, said oscillator circuit means having a period of oscillation proportional to the rate of discharge of each of said reference capacitors and said pressure cell capacitance, and said time interval measuring means operative to generate a binary number representing the period of oscillation of said oscillator circuit means in discharging each said reference capacitor and said pressure cell capacitance in said capacitance measuring circuit.

10. In a radiosonde according to claim 9, said pressure cell including a substrate and pressure-responsive diaphragms mounted on opposite surfaces of said substrate in offset relation to one another, capacitance plates centered within each of said diaphragms electrically connected to one another, one of said capacitance plates projecting beyond the periphery of the other of said diaphragms and including an electrical connection extending through said substrate into connected relation to said capacitance measuring circuit.

11. In a radiosonde according to claim 10, said oscillator circuit means including a comparator and a fixed resistance interconnected between the output of said comparator and said common connection to said capacitors in said capacitance measuring circuit.

12. In a radiosonde according to claim 9, including first variable resistor means whose resistance varies in direct proportion to temperature, second variable resistor means whose resistance varies in direct proportion to relative humidity, and a potentiometer having a resistance which is manually adjustable to represent a predetermined pressure level.

13. In a radiosonde according to claim 12, said microprocessor including means to compare the capacitance of said pressure cell and the resistance of said potentiometer and to interrupt the transmitter when the pressure level as represented by the capacitance in said pressure cell is below the predetermined pressure level.

14. In a radiosonde according to claim 9, said means for charging said capacitor including a bipolar transistor and control signal means from said microprocessor operative to turn said transistor on to discharge said capacitor.

15. In a radiosonde wherein a variable capacitance, pressure responsive transducer includes a non-conductive substrate having metal diaphragms hermetically secured to opposite surfaces of said substrate in overlapping spaced relationship to a respective fixed capacitor on said opposite surfaces, the improvement comprising:

said diaphragms having peripheral boundaries disposed in offset but partially overlapping relation to one another and said plates disposed in offset but partially overlapping relation to one another, a first conductor extending through said substrate electrically interconnecting overlapping portions of said plates, a portion of one of said plates extending along one of said opposite surfaces beyond the peripheral boundary of said diaphragm on the other of sad opposite surfaces, and a second conductor extending from said portion into communication with the other of said opposite surfaces; and an electronic measuring circuit mounted externally of said transducer including an external lead connecting said electronic measuring circuit to said second conductor.

16. In a radiosonde according to claim 15, said substrate being composed of a single layer of electrically non-conductive material.

17. In a radiosonde according to claim 15, said electronic measuring circuit mounted on said substrate.

18. In a radiosonde according to claim 15, including a metallic ring interposed between the peripheral boundaries of each of said diaphragms and said substrate, and a sealant applied to the juncture of said peripheral boundary and said metallic ring.

* * * * *